US009380323B2

(12) United States Patent
Carbunar et al.

(10) Patent No.: US 9,380,323 B2
(45) Date of Patent: *Jun. 28, 2016

(54) CACHE EVICTION

(71) Applicant: Google Technology Holdings LLC, Mountain View, CA (US)

(72) Inventors: Bogdan O. Carbunar, Elmhurst, IL (US); Michael D. Pearce, Barrington, IL (US); Venugopal Vasudevan, Palatine, IL (US); Loren J. Rittle, Lake Zurich, IL (US); Michael L. Needham, Palatine, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,007

(22) Filed: Sep. 10, 2015

(65) Prior Publication Data

US 2015/0382032 A1 Dec. 31, 2015

Related U.S. Application Data

(63) Continuation of application No. 14/584,909, filed on Dec. 29, 2014, now Pat. No. 9,154,811, which is a continuation of application No. 13/115,139, filed on May 25, 2011, now Pat. No. 8,925,022.

(51) Int. Cl.
*H04N 7/173* (2011.01)
*H04N 21/231* (2011.01)
(Continued)

(52) U.S. Cl.
CPC ..... *H04N 21/23113* (2013.01); *H04N 21/2181* (2013.01); *H04N 21/2225* (2013.01); *H04N 21/23106* (2013.01); *H04N 21/2402* (2013.01); *H04N 21/64738* (2013.01)

(58) Field of Classification Search
CPC .................... H04N 21/23113; H04N 21/2402; H04N 21/23106; H04N 21/2181
See application file for complete search history.

(56) References Cited

U.S. PATENT DOCUMENTS 5,956,716 A * 9/1999 Kenner ............. G06F 17/30017
7,107,606 B2 9/2006 Lee
(Continued)

FOREIGN PATENT DOCUMENTS

WO 2012161946 11/2012

OTHER PUBLICATIONS

PCT Search Report for Application No. PCT/US2012/036717; mailed Aug. 7, 2012.
(Continued)

*Primary Examiner* — Oschta Montoya
(74) *Attorney, Agent, or Firm* — Lowenstein Sandler LLP

(57) ABSTRACT

A method and apparatus for downloading content within a video-on-demand system is provided herein. During operation a Video Home Office (VHO) will cache a subset of the Video Service Office (VSO) content. When a user requests content that is not stored on the VHO, the VHO will request that content from another VHO or the VSO. In order to reduce the additional network load imposed during item forwarding while attempting to balance the total load on all the links interconnecting the VSO and VHOs, recorded traffic history metrics are used to predict their future or current traffic. A VHO or VSO is chosen for fetching the content that will result in the lowest predicted traffic on the interconnecting links.

20 Claims, 6 Drawing Sheets

(51) Int. Cl.
*H04N 21/2225* (2011.01)
*H04N 21/647* (2011.01)
*H04N 21/218* (2011.01)
*H04N 21/24* (2011.01)

(56) References Cited

U.S. PATENT DOCUMENTS

| | | | |
|---|---|---|---|
| 7,444,662 | B2 | 10/2008 | Faibish et al. |
| 7,548,948 | B2 | 6/2009 | Klemets et al. |
| 7,596,664 | B2 | 9/2009 | Ishikawa et al. |
| 7,603,439 | B2 | 10/2009 | Dilley et al. |
| 7,991,883 | B1 * | 8/2011 | Streeter ............ H04L 67/06 709/203 |
| 8,028,319 | B2 * | 9/2011 | Scholl ............ H04N 7/17318 725/86 |
| 8,087,056 | B2 * | 12/2011 | Ryu ............ H04N 7/17318 725/115 |
| 8,925,022 | B2 | 12/2014 | Carbunar et al. |
| 9,154,811 | B2 | 10/2015 | Carbunar et al. |
| 2004/0103437 | A1 * | 5/2004 | Allegrezza ......... H04N 7/17336 725/95 |
| 2004/0143850 | A1 * | 7/2004 | Costa ............ H04N 7/17318 725/115 |
| 2004/0190524 | A1 * | 9/2004 | Golla ............ H04L 12/40032 370/395.4 |
| 2007/0156845 | A1 | 7/2007 | Devanneaux et al. |
| 2008/0091840 | A1 | 4/2008 | Guo et al. |
| 2009/0083279 | A1 | 3/2009 | Hasek |
| 2009/0193485 | A1 | 7/2009 | Rieger |
| 2011/0107030 | A1 | 5/2011 | Borst et al. |

OTHER PUBLICATIONS

Chankhunthod, A., et al, "A hierarchical Internet object cache"; Proceedings of the Usenix Annual Technical Conference; Jan. 22, 1996.
PCT Written Opinion for Application No. PCT/US2012/036717; mailed Nov. 25, 2013.
PCT International Preliminary Report on Patentability for Application No. PCT/US2012/036717; mailed Nov. 26, 2013.
Non-final Office Action mailed on Sep. 14, 2012, on U.S. Appl. No. 13/115,139.
Non-final Office action mailed on Jul. 18, 2013, on U.S. Appl. No. 13/115,139.
Final Office action mailed on Jan. 14, 2014, on U.S. Appl. No. 13/115,139.
Non-final Office action mailed on May 20, 2014, on U.S. Appl. No. 13/115,139.
Notice of Allowance mailed on Aug. 28, 2014, on U.S. Appl. No. 13/115,139.
Notice of Allowance mailed on May 29, 2015, on U.S. Appl. No. 14/584,909.

* cited by examiner

Prior-Art

CACHE EVICTION

CROSS-REFERENCES TO RELATED APPLICATIONS

This application is a continuation of U.S. application Ser. No. 14/584,909, filed Dec. 29, 2014, and entitled "Caching Content," which is incorporated herein by reference. U.S. application Ser. No. 14/584,909 is a continuation of U.S. Pat. No. 8,925,022, filed May 25, 2011, and entitled "Method and Apparatus for Transferring Content," which is incorporated herein by reference.

FIELD OF THE INVENTION

The present invention relates generally to distributed caching for video-on-demand systems, and in particular to a method and apparatus for transferring content within such video-on-demand systems.

BACKGROUND

Video on Demand (VoD) systems allow users to select and view video content on demand. The content is stored by the VoD operator at various locations in the network. The content can be either streamed in real-time to a user set-top-box (STB) or downloaded on a user device (PC or DVR), over a content delivery network (CDN).

VoD systems comprise several components (see FIG. 1). A video service office (VSO) 101 or headend is provided acting as a master server that has a content library storing all the content in the system. The VoD system comprises a streaming server such as a B-1 server available from Motorola Mobility, Inc. The VSO is the entry point of all the content in the system, where the content is initially processed and stored. The system has several video home offices (VHOs) 102 acting as servers. Each VHO 102 consists of caching servers and streaming servers such as a B-3 server available from Motorola Mobility, Inc. The streaming servers process and send content requested by users. The servers store content at the VHOs prior to being sent to users. The VSO 101 and the VHOs 102 are connected over a regional network such as a fiber-optic ring. The VHOs 102 provide content to the STBs 103.

In some current implementations the VHOs 102 are exact replicas of the VSO 101 in terms of the stored content. The VSO 101 uses networking technologies such as the negative acknowledgment (ACK) reliable multicast (NORM) protocol in order to distribute new content across the network to the VHO 102 caches. This solution is preferred due to (i) the efficiency of NORM (store-and-forward across the fiber ring) and (ii) lower access latency—requests made to VHO 102 servers are always satisfied locally. However, this approach has scalability issues, imposing higher costs on the operator. This is because VHO 102 caches need to have large storage space, to store all the content in the system.

Not all content will be needed at all VHOs 102. For instance, data from a recent survey of a VSO 101 shows that only 8000 items from a 40000 item library were requested during a 3 day recorded interval. Moreover, the items of interest will likely differ between regions served by different VHOs 102, making an exact replication solution wasteful. Finally, whenever the VoD operator decides to offer more content, the storage (disks+RAM) on each VHO 102 needs to be upgraded. The cost of the upgrade is then proportional to the number of VHOs 102.

One solution to this problem is to store a subset of the VSO 101 at each VHO 102. A problem then becomes how to download content that is not stored at the VHO 102 when, or if that content is requested by a user. Therefore a need exists for a method and apparatus for downloading content within a video-on-demand system.

Figure 1:
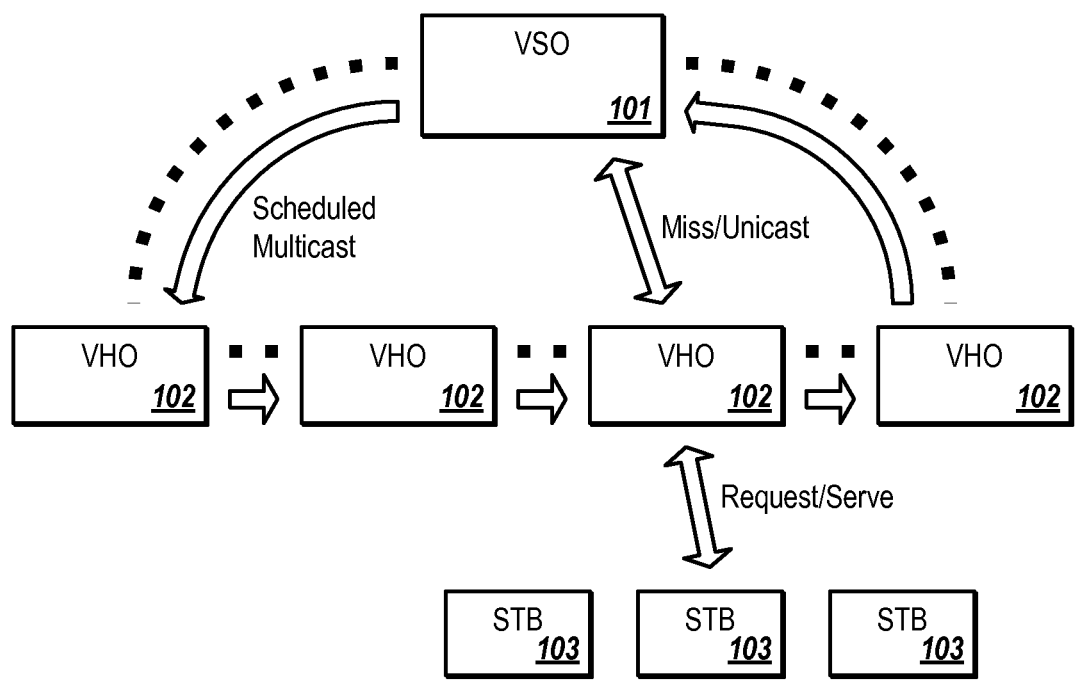
FIG. 1 is a block diagram of a prior-art VoD system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as circuitry may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE DRAWINGS

In order to alleviate the above-mentioned need, a method and apparatus for downloading content within a video-on-demand system is provided herein. During operation a VHO will cache a subset of the VSO content. When a user requests content that is not stored on the VHO, the VHO will request that content from another VHO or the VSO. In order to reduce the additional network load imposed during item forwarding while attempting to balance the total load on all the links interconnecting the VSO and VHOs, recorded traffic history metrics are used to predict their future or current traffic. A VHO or VSO is chosen for fetching the content that will result in the lowest predicted traffic on the interconnecting links.

The above described technique for operating a VoD system allows for VHOs to reduce the amount of memory since they no longer store a complete replica of the VSO. Additionally, because a VHO will fetch content from the VHO or VSO that will result in the lowest predicted traffic, total network load imposed during item forwarding is reduced and the total load on all the links is better balanced.

The present invention encompasses a method for receiving content. The method comprises the steps of receiving, by the server, a request for the content, determining that the requested content is not stored by the server, determining if a second server has the content, determining if a third server has the content, and requesting the content from the second server when it is determined that a cost associated with retrieving the content from the second server is less than a cost associated with retrieving the content from the third server. The server, the second server, and the third server maintain a subset of content available from a master server, and the subset of content maintained on the server, the second server, and the third server is not identical.

The present invention additionally encompasses, a method comprising the steps of receiving, by a first VHO, a request for content from a STB, determining, by the first VHO, that the requested content is not stored by the first VHO, determining if a second VHO has the content, determining if a third VHO has the content, and requesting the content from the second VHO when it is determined that a cost associated with retrieving the content from the second VHO is less than a cost associated from retrieving the content from the third VHO. The first, second, and third VHOs maintain a subset of content available from a video service office (VSO), and the content maintained on the first, second, and third VHOs is not identical.

The present invention encompasses a VHO comprising a server receiving a request for content from a STB, determining that the requested content is not stored by the VHO, determining if a second VHO has the content, determining if a third VHO has the content, and requesting the content from the second VHO when it is determined that a cost associated with retrieving the content from the second VHO is less than a cost associated from retrieving the content from the third VHO. The first, second, and third VHOs maintain a subset of content available from a VSO, and the content maintained on the first, second, and third VHOs is not identical.

Note that an extreme case of caching at the VHOs, the cache is eliminated completely (0 size cache). The central library and its streaming server would be responsible for processing all the requests. While significantly saving resources (by cutting the costs of maintaining and upgrading VHO sites) this approach would place the entire traffic load on the fiber ring. Note that this comes in contrast with the existing solution, where the fiber ring only supports multicast of new items and with the caching solution, where the fiber ring need to support only traffic imposed by VHO cache misses.

Since the geographical component of the VoD system naturally imposes more load to be placed on the links adjacent to the VSO, cooperative algorithms were developed that enable VHO sites to satisfy missed requests from peer sites.

The goal is to (i) reduce the additional load imposed during item forwarding while (ii) attempting to balance the total load on all the links in the system. The approach to this problem is based on the observation that for large populations the user behavior exhibits repetitive patterns. We then use recorded history of metrics of interest to predict their future values. One metric of interest is the number of requests received for an item (i.e., a specific piece of content) per minute. We use this metric to compute the penalty of not storing the item in the cache of a VHO for a future interval and then use this value to decide which items to cache or stream and which items to evict from the cache.

In a variation on this idea, we can define a network penalty of an item to be proportional to the item's size in bytes, the number of requests expected to be received for the item in the close future (next 10-60 minutes) and the sum of the weights of all the links traversed by the item. That is, if the item is not locally stored, its network penalty defines the load placed on the network when fetching it from a site that stores it. The network penalty or cost of items is used to drive the cache replacement policy and to decide what items to cache locally and what items to stream directly from the VSO to the requesting client.

Another metric of interest is the number of items simultaneously transferred over any of the ring's links. We use this metric to derive an estimate of the transfer rate over that link for a future interval. The estimate is then used by VHOs to choose to transfer a missed item over the least congested path.

System Architecture

Figure 2:
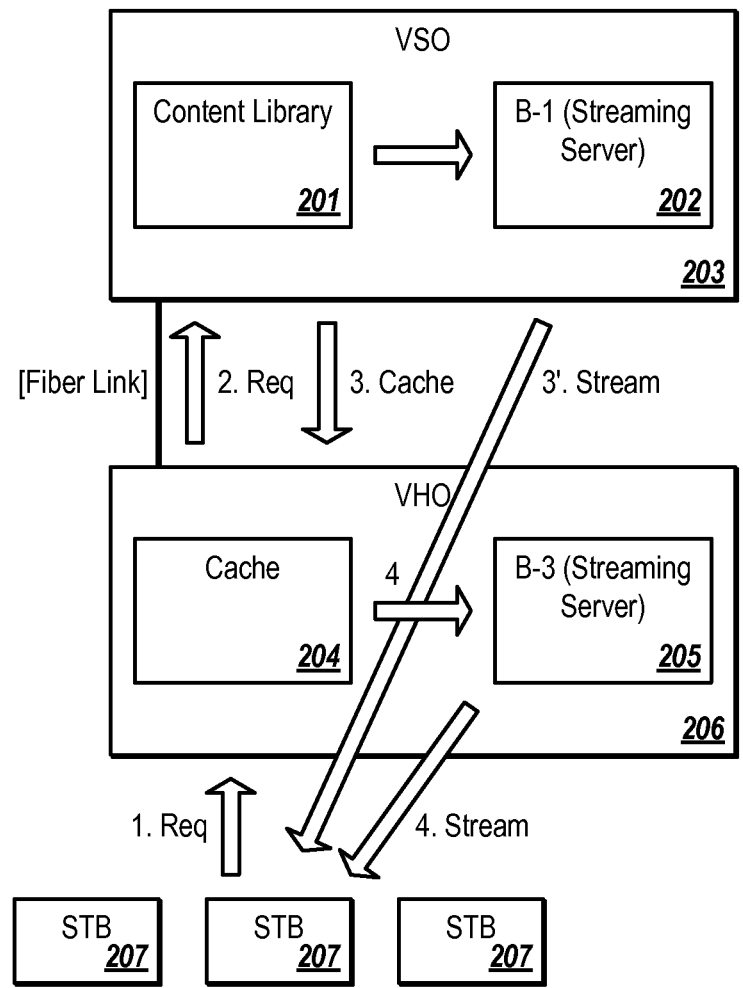
FIG. 2. is a block diagram of a VoD system.

The system we consider consists of the components shown in FIG. 2. The Video Service Office (VSO) 203 (or master server 203) is a central data repository. The VSO 203 processes each content item as it enters the system, packages it and stores it in a local content library 201. The VSO 203 also consists of a large streaming server 202 (e.g., Motorola's B-1 Video Server) that can stream items directly to users.

The second component is the Video Home Offices (VHOs) 206 (only one shown in FIG. 2). VHO 206 serves disjoint geographical sub-regions of the area served by the VSO 203. All VHOs 206 maintain a subset of content available from a master server (VSO), and the subset of content maintained on each VSO is not identical.

Each VHO 206 consists of a storage component (cache 204) and a smaller capacity streaming server (e.g. Motorola B-3) 205 that processes item requests from users. Let N denote the number of VHOs 206 supported by a VSO 203. The VSO 203 and the VHOs 206 are connected through a high speed fiber ring (e.g., an OC192-9.6 Gbps Metro Ring). For each new item in the system, the VSO 203 uses a multicast algorithm (e.g., NORM) to distribute the item to each VHO 206. Each VHO 206 chooses whether to cache the item or not.

The last component is the user, browsing the content listing and requesting content over a set-top-box (STB) 207. Requests made by users via an STB are sent to a single VHO 206 server—the one serving the sub-region containing the user.

Note that for simplicity we do not include all system details. For instance, a VHO 206 is not connected directly to STBs but instead, to a few tens of hybrid fiber-coax (HFC) nodes. Each such node serves a smaller region (e.g., neighborhood) of up to a few thousand homes. Any user request reaches the VHO 206 through the node serving the user's neighborhood. We assume nodes do not cache content, but simply carry control and data traffic.

Whenever a miss occurs (i.e., a user requests an item not stored on the VHO 206 cache), the VHO 206 needs to fetch the item. The VHO 206 can fetch the item from another VHO 206 site or from the VSO 203. Let the site that is chosen be identified as the source. The source then streams the item directly to the user (from the B-1 server) or reliably sends the item to the VHO 206 who then caches and streams it to the user. In the following text we first focus on developing a caching algorithm for each VHO 206. Then we develop efficient algorithms for finding peers containing missed items and choosing the best peer for fetching such items based on a cost associated with the fetching.

The Data

We have three data sets, collected from various cities; our largest dataset has been collected over 18 days. The total number of items accessed was 12625 for a total of 4.6 million accesses.

Each data set consists of two types of data. The content database contains metadata of all content items stored on the VSO 203. Each entry in the content database refers to a single item and has the format

[Name, Size(B), BitRate(bps)]

where BitRate is the item's encoding rate in bits per second. The stream database contains information about requests made by VoD system users. Each entry refers to the request of a user and has the format

[StreamId, ContentName, StartT, EndT, GroupId, IP]

and consists of a unique stream Id, the name of the content consumed between time StartT and EndT, from address IP with group GroupId.

Note that the items in the content database are the ones accessed during the 18 days in the stream database. However, not all items are placed in the VSO 203 storage at the same time.

Instead, some items are already in the VSO 203 at the beginning of the 18 days, some are placed later and some are removed (can no longer be requested by clients) before the end of the 18 day dataset. Knowing the VSO 203 insertion and removal timestamps of items would help improve the performance of the VHO 206 caching decisions. For instance, items newly inserted could have associated popularity hints that could be used to determine their usefulness. Also, items no longer accessible by clients can be immediately removed from the cache (if present). However, the datasets we have do not provide this information. Instead, as we will describe later, the caching algorithms we propose have to infer this information.

Figure 3:
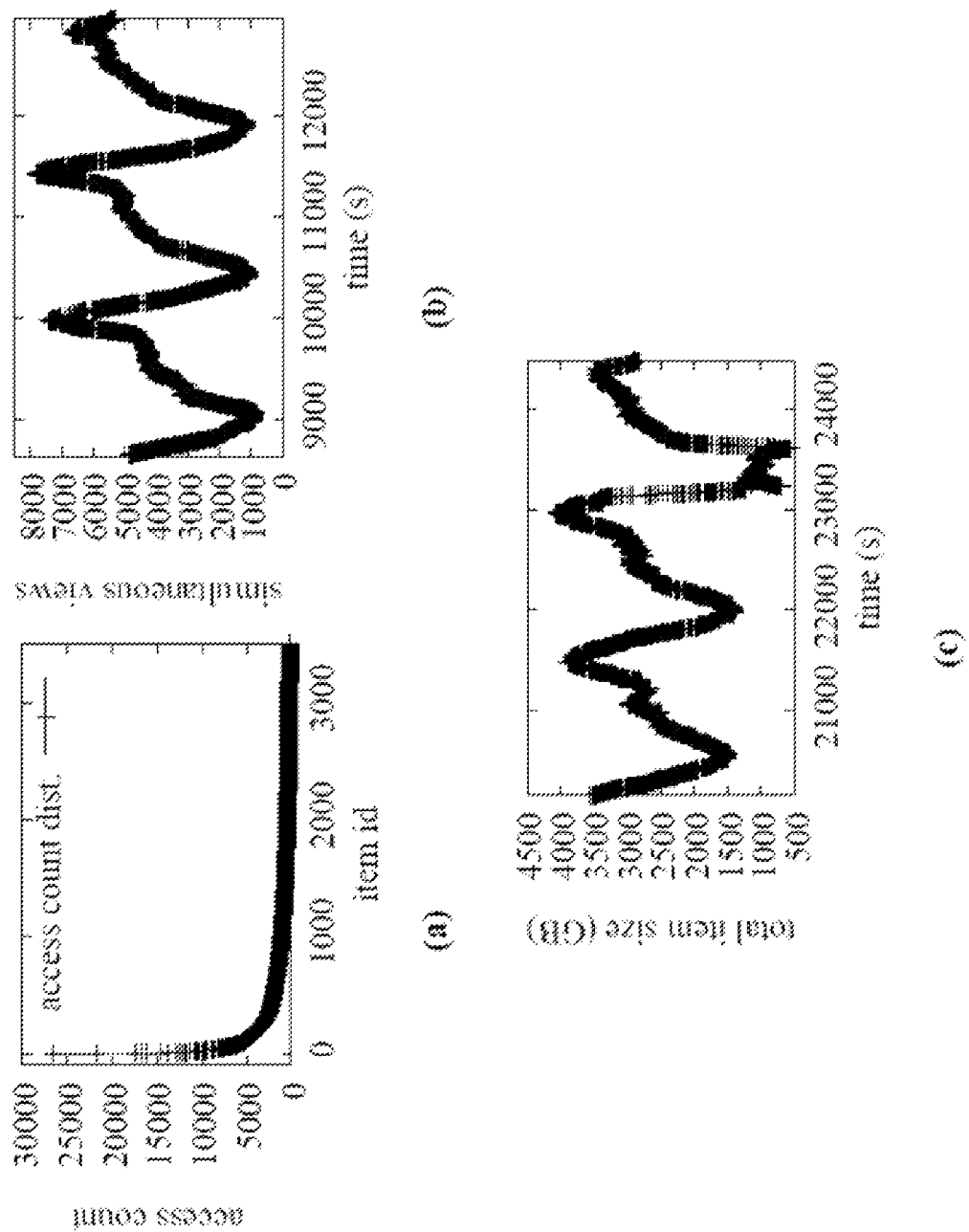
FIG. 3. shows use-data for a VoD system.

Long-Tail Content Popularity: FIG. 3(*a*) shows the distribution of the per-item access count for the 18 days. The horizontal axis is the item list in decreasing popularity order and the vertical axis is the per-item access count. The access count distribution is long-tail, with the most popular item being accessed more than 26000 times but the item ranked 1000 (out of 12625 total items) in the popularity list being accessed only 1100 times.

Simultaneous Views Stats: FIG. 3(*b*) shows the evolution over three days of the total number of users accessing the service in a particular city, with a one minute granularity. The largest number of simultaneous users is 7822. Each day can be identified as one of the humps in the graph. While nights still impose a load on the VOD server, that load is significantly lower than during the day. The shape of the number of simultaneous views for each day is different, since each day has its own viewing pattern. FIG. 3(*c*) shows the evolution over other three days of the total size (in MB) of the items being viewed at any time, (one minute granularity). The maximum size is 4.07 TB. It is interesting to see that the two peaks do not coincide. This is probably because when the peak storage load is reached, the pool of items watched is larger than during the peak user load, when fewer users are consuming more items.

When multiple VHO 206 sites incur misses, they naturally impose a traffic load on the network in order to fetch the items missed. While the design space for algorithms to retrieve the missed items is quite large, we note that not all solutions are good. For instance, in a straightforward approach, each VHO 206 fetches missed items from the VSO 203. However, in this solution, the VSO 203 and its adjacent links become a system bottleneck. While the VSO 203 has a B1 streaming server well capable of handling all the (miss) traffic, its adjacent links will be unable to handle the traffic. Thus, optimizing the traffic on the system links becomes a problem of paramount importance.

We now define several metrics of interest and we provide an intuition on why they are important. In the following section we devise several item retrieval algorithms that attempt to optimize these metrics.

The following metrics are defined for a given input time interval, which by default is one day. Let $V=\{V_1, \ldots V_n\}$ be the set of VHO 206s in the system and let L be the set of inter-VoD links in the system. L includes also the links adjacent to the VSO 203. Note that the links in our system are bidirectional, since each ring component link is full-duplex. Let MISS(V,T) denote the set of items missed on VHO 206 V during time interval T and let Cache($V_i$) denote the set of items stored on site V; at a given time. Let dH(A,B) denote the distance in hops between sites A and B (one hop denoting a connection between adjacent sites).

Definition: Let Total Miss Traffic (TMT) be the sum of the size of all the items missed by all the VHO 206s. Let Total Link Traffic (TLT) be the sum of the traffic imposed on all the links in the system.

Obviously, a first goal is to reduce the TMT.

Note that TLT and TMT are different. In fact TLT(T)≥TMT(T). To see why this is the case, consider the example in FIG. 4, where $V_1$ fetches item $I_1$ from the VSO 203, and $V_2$ fetches item $I_2$ from the VSO through $V_1$. Then, TMT=Size($I_1$)+Size($I_2$) whereas TLT=Size($I_1$)+2Size($I_2$), where Size(I) denotes the size of item I in bytes. Note that if $V_2$ fetches $I_2$ from $V_1$ or $V_3$, then TLT=TMT.

This leads to our second goal.

Goal: Minimize the value TLT-TMT. This implies that upon a miss for an item I, VHO A should fetch the missing item from the site B (the VSO 203 or another VHO 206) that is closest to it. The next metric attempts to capture how well is the TLT traffic balanced on all the links in the system.

Definition: Let BLT denote the Bottleneck Link Traffic. That is, BLT defines the traffic imposed on the most utilized link in the system. Let MLT denote the Minimum Link Traffic, that is, the link incurring the least traffic in the system. Then, we define the System Link Balance, SLB as the difference between BLT and MLT. A small SLB value denotes a balanced system.

This definition leads us to our next goal.

Goal: Minimize the SLB=BLT−MLT value.

One way to achieve a small SLB value is to prefer to add traffic on less utilized links, i.e., links that are not regularly used to convey MISS traffic from the VSO 203 to the VHO 206.

Figure 4:
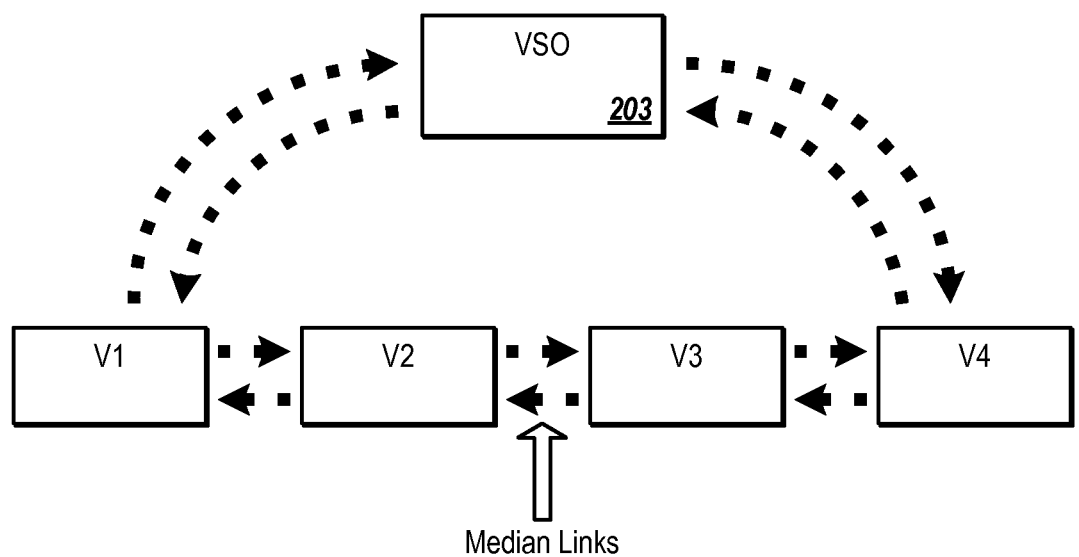
FIG. 4 illustrates a VoD system of FIG. 2 having bi-directional links.

Continuing our previous example, using FIG. 4, $V_2$ should prefer fetching missed item $I_2$ from $V_3$ rather than from $V_1$. This is because the directed link between $V_3$ and $V_2$ is likely to be less congested than the link between $V_1$ and $V_2$. Note however that $V_3$ may not cache item $I_2$, in which case should try fetching it from $V_1$. If $V_1$ does not cache it either, the VSO 203 certainly will.

VHO 206 Level Caching

In our work we assume each VHO 206 stores only a subset of the items in the system. Since those items are unlikely to be the only ones requested by users of the VHO 206, misses will occur, in which case the missing item may be fetched and stored at the VHO 206. If the storage at VHO 206 is already full, then one or more items in storage will need to be evicted to make room for the newly requested item. Thus, replacement policies need to be implemented on each VHO 206. Several caching replacement techniques may be used at the VHO 206 level. We may use one of several techniques, including Least Recently Used (LRU). In a very simple approach, each VHO 206 simply caches the most popular items requested. However, these cache replacement strategies are often not efficient. In a later section, we describe a novel cache replacement strategy based on network awareness.

Distributed Caching

A straightforward approach is to fetch all missed items directly from the VSO 203. However, this approach fails on both our previous goals. First, the TLT-TMT will be high, since the links adjacent to the VSO 203 will need to support all the traffic generated by misses. Second, the SLB=BLT-MLT will also be high, since the BLT will occur on one of the links adjacent to the VSO 203 and MLT will be on the middle link: in the example from FIG. 4, the links between $V_2$ and $V_3$. A solution to these issues relies on other VHOs 206 to provide the missed content. That is, the cache and streaming server of a VHO 206 site can be used to provide missing items to other VHO 206 sites. While this approach is likely to relieve some of the traffic incurred by the links adjacent to the VSO 203, care must be taken on the choice of the site to stream, to avoid introducing new bottlenecks.

Whenever a miss occurs at a VHO 206 site, the VHO 206 will (i) discover which other sites have the content, (ii) choose the most suitable site and (iii) retrieve the content. In the following we detail each of these steps.

Peer Discovery

Let A be a VHO site at which a request for item I results in a miss. A needs first to discover which other sites store content I. Note that in the worst case, only the VSO 203 will store the item. There are several ways to collect this information and we describe several of them. We also provide an analysis of their cost.

Token Passing: VHO site A generates a special packet of format

[TOKEN, Id(A), I]

and sends it to its neighbor in a predefined direction (e.g., clockwise neighbor). Each node, upon receiving such a packet from its (counterclockwise) neighbor, verifies if it stores the requested item. If it does, it appends its id to the packet. Otherwise it leaves the packet intact. In both cases it forwards the resulting packet to it clockwise neighbor. When the token reaches it source (A), the source extracts the list of candidate VHO 206s from the back of the token packet. The cost of this approach consists of |L| packets, one for each link in the ring (note: |L| designates the number of links in the set of all links L).

Bifurcation Token: VHO site A generates a special packet of the same format as before. However, instead of sending this packet as before, it duplicates it and sends each copy to one of its neighbors. Each VHO N that receives such a packet remembers the neighbor from which it received it, S. If N stores I, it generates a new response packet of format

[RSP, Id(A), I, Id(N)]

and sends it back to S. Otherwise, it leaves the packet unchanged and forwards it to its neighbor opposite S. A VHO 206 that receives a RSP packet, forwards it unchanged to the neighbor opposite to the one from which it has received it. Note that in this solution two packets travel the ring simultaneously. In the worst case, each packet stops at the VSO 203. On average, each packet will travel |L|/4 hops each way, for a total of |L|/2 hops per packet. Thus, the total traffic is |L| messages. Note that the goal here is to discover only the nearest site that stores item I.

Distributed Hash Table: In this solution, each VHO 206 (including the VSO 203) is responsible for storing index information about a set of items in the system. The distribution of this index information is performed based on a hash value of each item. Specifically, each VHO 206 has a unique ID and so does each item. The unique ID of an item is computed for instance as a hash of the item metadata (a hash function is a mathematical procedure that generates a shorter, fixed-length numerical value from a longer, variable length piece of text). Then, for a given item I, a single site (pointer site) is responsible for maintaining information about which other sites are actually storing item I. The pointer site is the VHO 206 whose ID is the closest to the item's ID. Let P(I) denote the ID of the site storing index information for item I. We show how the index information is used and maintained using a simple example. When a miss occurs for item I at site A, since A's cache is full, assume A evicts item R from its cache in order to be able to store I. Then, given I and R, A finds their corresponding pointer sites, P(I) and P(R). A contacts I's pointer site with a message of format

[GET_PTR, P(I), Id(A), I]

P(I) responds with the list of sites storing item I and also stores Id(A) among the list of sites storing I. A contacts site P(R) with a message of format

[EVICT, P(R), Id(A), R].

Upon receiving this message, site P(R) removes Id(A) from the list of sites storing item R. Note that the cost of this procedure is 3|L|/4 messages. This is because on average, the distance between A and each of P(I) and P(R) is |L|/4. However, the message between A and P(I) goes roundtrip and the message between A and P(R) is only one way.

Note that VHO 206 sites can fail and the pointer information they store may become unavailable. One solution is to have each node automatically replicate its data to a secondary node determined using a different hash function. Then DHT accessors can use that backup hash function to find the backup node if their initial lookup request goes unanswered.

In another solution the VSO stores a database where for each item I, a list of sites storing I is being maintained. Each time a miss occurs at V, V contacts the VSO with the list of items in its cache, and the missed item I. The VSO database can be updated each time a caching decision is made at a VHO site (when an item is stored and some are evicted). This is likely to not be very frequent since we try to minimize the number of writes. The VSO database could also be updated only periodically. This may make the database inaccurate, depending on the frequency of the updates.

Peer Choice

Once A has found the list of sites that store item I, it has to choose one of them to provide the content. Let C(I) denote the list of candidate sites for item I. Note that C(I) contains at least one site, the VSO 203. If C(I) contains only the VSO 203, there is no choice but to obtain the item from the VSO 203. If C(I) contains more than one site, a choice has to be made.

In accordance with a preferred embodiment, For each site B in C(I), the VHO computes the shortest path connecting B to A. Let $L_{ba}$ be the set of all the directional links connecting B to A on that shortest path. For each link k in $L_{ba}$ we compute an estimate of the time it takes to transfer item I over k. Let T(I,k) denote that estimate. We first show to compute T(I,k) and then how the circuitry uses it to choose a peer to transfer the item.

Estimating Future Link Congestion:

In the following, we try to estimate how many flows (simultaneous transfers) will occur per minute for any link—FPM (k,m), where m is any given future minute. Given that estimate, we can infer how many bytes will be transferred during minute m for item I $$BPM(I,k,m)=Cap(k)/(FPM(k,m)+1)$$

That is, the bytes transferred for item I on link k in one minute (BPM) is the capacity of k, Cap(k), divided equally among all existing flows on k (the ones already there plus 1 for item I). We compute BPM(I,k,m) over successive minutes until the sum of all BPM values, exceeds or equals Size(I), the size of item I in bytes. Then, we set T(I,k)=T, the total number of minutes computed.

VHOs use a low pass filter to infer the value FPM(k,m) for a future minute m. Specifically, given historic (and stored) values FPM(k,i), where i−1, . . . p, where p<m is the last recorded minute, the value FPM(k,m) is computed to be an average over those values:

$$FPM(k,m)=\Sigma_{i=1\ldots m-1} FPM(k,i)/(m-1)$$

Note that FPM(k,m) has to be computed iteratively. That is, since p is the last minute where FPM was recorded, we compute first FPM(k,p+1), then FPM(k,p+2) and so on, up to minute m.

Also note that the above formula assumes infinite storage: all previous recorded values need to be stored. To avoid this problem, we propose two solutions. In the first solution, we only record a window of past values and compute future values starting with those stored values. In the second solution, we use a stochastic estimator to predict future values. Specifically, we only store a running average value, avgFPM. Then, given a new FPM(I,p) at minute p, we update avgFPM to be $$avgFPM=avgFPM\times\beta+FPM(I,p)\times(1-\beta)$$

where $\beta$ in [0,1] is a parameter deciding how much weight is given to the old estimate and how much to the new reading in calculating the new estimate. Then, we compute the FPM(k, m) estimate for a future minute m iteratively. First, copy avgFPM into FPM(k,p) of the current minute p and use it as a new reading to compute a new avgFPM value. Then, copy the new avgFPM to FPM(k,p+1) and continue the process until the current minute is m.

Peer Choice: given the estimate T(I,k) for any link k we define the cost of the path $L_{ba}$ to be the maximum T(I,k) value for any link k in $L_{ba}$. That is, the cost of the path is defined by the bottleneck link in that path, which is the link that takes the longest to transfer item I. Then, between all sites B in C(I) we choose the one whose path $L_{ba}$ has the minimum cost, that is $$Cost(B)=\min_{B\ in\ C(I)}(\max_L T(I,k))$$

That is, the winner is the one that has the largest bottleneck link.

Collecting Statistics: Note that this solution assumes that site A is able to compute the predictions or all links connecting B to it. For this, A needs to know the FPM values for the links. In the following we show how to extend the token bifurcation peer discovery method to enable A to collect such information. Specifically, peers piggyback this information on RSP packets. That is, if a peer N reached by a token (send by a previous site P) stores item I it generates a new response packet of format

[RSP, Id(A), I, Id(S), Stats(link(N,P))]

where Stats(link(N,P)) are the FPM statistics related to the link connecting site N to the next site en route to A. Note that site N has such statistics since it is the one generating or forwarding flows on link(N,P). A VHO 206 that receives a RSP packet, appends to it its own statistics for the next link (in A's direction) and forwards the resulting packet on that link.

Item Transfer

Once a choice has been made for the source peer (B), site A needs to solve several problems. First, consider that a missed item may be either reliably transferred and cached by A, or streamed directly from B to the user making the request. This is because each site B, has a streaming server (the VSO 203 has a B-1 server and VHO 206s have B-3 servers). The decision whether to transfer or stream is made by a caching algorithm running on site A. Then, the item A needs is requested from B with a message of format

[GET/STREAM, Id(A), Id(B), I]

When site B receives this message, it first needs to confirm that it can support this flow for A. Moreover, B needs to mark item I as no evict until the transfer completes, to make sure it will not evict the item before transferring it.

Unable to Transfer: Site B may also be unable to transfer item Ito site A. Reasons for not being able to support this flow include no longer caching the item but may also include changes in the number of flows at site B leading to fewer available resources (both streaming resources and traffic bottlenecks).

Site B then has to reply with a confirmation of its decision

[CONF/ABORT, Id(B), Id(A), I]

If A receives an ABORT message, it repeats the above process for the next best candidate site from its C(I) list. If A receives a CONFIRM, it transfers the item.

Figure 5:
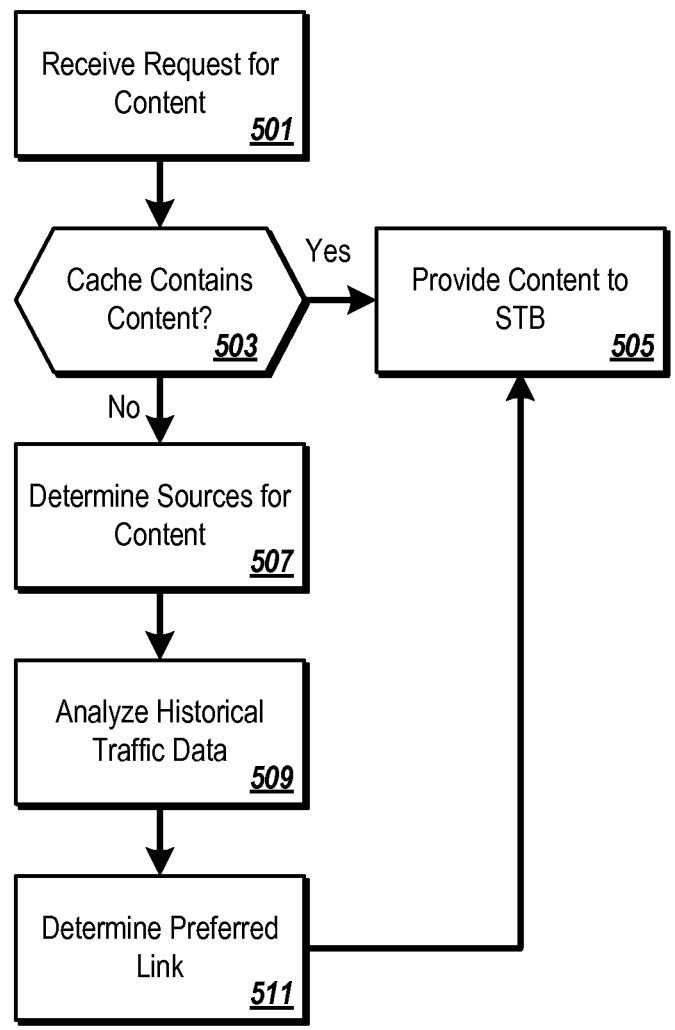
FIG. 5 is a flow chart showing operation of the VoD system of FIG. 2 and FIG. 4.

FIG. 5 is a flow chart showing operation of the VoD system of FIG. 2 and FIG. 4. The logic flow begins at step 501 where VHO 206 receives a request for content from an STB 207. In particular at step 501 server 205 receives the request. At step 503, server 205 determines if the requested content is stored by the VHO by determining if cache 204 contains the requested content. If so, the logic flow continues to step 505 where the content is provided to the STB 207. If, however, at step 503 it is determined that cache 204 does not contain the requested content, then server 205 will need to determine a best source for the content. As described above, the source could be VSO or another VHO (second, third, . . . etc. VHO).

With the above in mind, the logic flow continues to step 507 where sources for the content is determined. In particular server 205 sends a message to other VHOs identifying the requested content. Messages from other VHOs will be received indicating whether or not they have the content. Once server 205 knows where the content is located (for example, on a second and/or third VHO), historical traffic data is analyzed for a plurality of links within the VoD system (step 509). More particularly, server 205 determines historical traffic data for links from the VHOs containing the content to itself, and for links from those VHOs to the STB. At step 511 a preferred link for providing the requested content to the STB is determined. As discussed above, the preferred link for the requested content is determined by using the historical traffic data to predict a current traffic for the links from VHOs who have the requested content. At step 511 the link with the lowest predicted traffic (cost) is then chosen as the preferred source. The content is then provided to STB 207 (step 505). The content may be provided from a VHO to server 205, and then from server 205 to STB 207, or alternatively may be directly from another VHO to STB 207.

Figure 6:
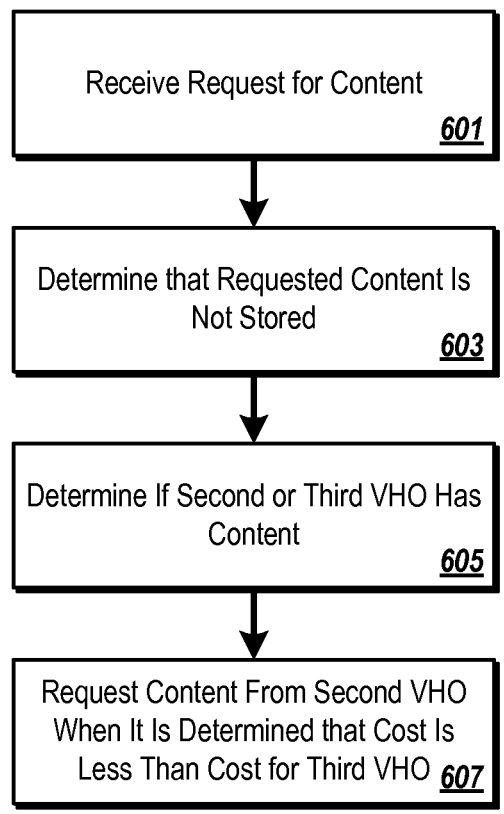
FIG. 6 is a flow chart showing operation of the VoD system of FIG. 2 and FIG. 4.

FIG. 6 is a flow chart showing operation of a VHO. The logic flow begins at step 601 where a request for the content is received by the VHO. The VHO then determines that the requested content is not stored by the VHO (step 603). The logic flow then continues to step 605 where the VHO determines if a second VHO has the content and if a third VHO has the content. The content is then requested from the second VHO (step 607) when it is determined that a cost associated with retrieving the content from the second VHO is less than a cost associated with retrieving the content from the third VHO.

It should be noted that in both FIG. 5 and FIG. 6 the content may be requested from the VSO (master server) when no other server has the content. As described above, the second server, and the third server maintain a subset of content available from the master server and may not contain the requested content. Additionally, the subset of content maintained on the server (VHO), the second server (VHO), and the third server (VHO) is not identical.

Additionally, it should be noted that in both FIG. 5 and FIG. 6 the server may determine that there is not enough room to cache the requested content and then determine items to evict from a cache at the server to make room for the requested content, so as to minimize a network penalty associated with evicting the subset of items. The network penalty is proportional to a size in bytes, a number of requests expected to be received for the content at some future time, and a fetch cost associated with retrieving the item. The fetch cost is based on the sum of link weights in the network path associated with fetching the content. Finally, a link weight is calculated as a ratio between traffic predicted on a link and a total traffic supported by all links.

Network Aware Cache Replacement (NAC)

Here, we describe a cache replacement strategy based on network awareness. NAG is run locally on each VHO site and takes into consideration not only data locally available such as item size or popularity, but also more global information. Specifically, each VHO (or server within each VHO) associates with each item a network penalty value: the cost likely to be imposed on the network if the item is not locally stored. Given an item I and an interval T, let S(I) be the size of I and let Reqs(V,I,T) denote the number of requests received for I during interval T on site V. Let FC(V,I,T) denote the fetch cost of a byte of item I on site V. Assuming that I is not in the cache of V, FC is a function of the path traversed by I to reach V. For instance, it could be hop count between V and the closest site storing I. For more details on the definition of FC, see below Defining the Fetch Cost. We now define the network penalty that a site V associates with an item I.

Definition: (Network Penalty) For an item I, a VHO site V and a future time interval T, we define the network penalty to be $NP(V,I,T) = S(I) \times Reqs(V,I,T) \times FC(V,I,T)$.

Essentially, the network penalty defines the cost incurred by the network if site V does not store item I during interval T. Note that the functions Reqs and FC are predictions for the actual number of requests and the cost of transfer during the future interval T. In the following we first show how to infer Reqs and FC and then show how the network penalty is used to drive the cache replacement strategy.

To estimate the future number of requests to be received in a given interval, a VHO will use a Requests Per Minute (RPM) metric. RPM(I,T) is the number of requests received for an item I at site V during a minute T. Given RPM, Reqs (V,I,T) would be the sum of the RPM values over the time interval T. An estimation of RPM may be obtained using historic stored values, in a manner similar to the computation of Flows Per Minute (FPM) described earlier.

Defining the Fetch Cost

We now discuss the FC function used above in the computation of the network penalty value for an item I on a VHO site V. The FC function is defined to be the cost to transfer one byte of item I on site V. That is, when a miss occurs on site V for item I, site V needs to transfer I and potentially store it locally. This will impose a load on the network links and FC attempts to capture this cost. Since multiple sites may store item I, V may have multiple choices to fetch it. We define FC(V,I) to be the minimum of the cost of all the paths from a site storing I to site V. That is, if PC(Vi,Vj) is the cost of a path between sites Vi and Vj, $FC(V,I) = \min\{PC(Vi,Vj)\}$ for all sites Vj that have cached item I.

In the simplest form, PC is defined as the hop count between its two input sites. However, this approach gives all links equal importance. As mentioned before, the links adjacent to the VSO are likely to incur more traffic. We propose to give links different weights, based on the traffic they are likely to incur. If w(1) denotes the weight associated with a link 1, we define PC(Vi,Vj) to be the sum of all link weights w(1) on the path between Vi and Vj.

Determining Link Weights

As mentioned before, the weight of a link should be a factor of the traffic that link will be likely to incur. In the following we define the weight of a link to be the ratio between the traffic predicted on that link and the total traffic supported by all the links:

$$w(1) = PT(1,T)/\text{sum } PT(Link,T) \text{ for all Link}$$

where PT(Link,T) denotes the traffic predicted to occur on Link in the interval T. Note that the sum of the weights of all the links in the system is 1. We can use multiple approaches to compute the PT, similar to the case for the RPM above. Each time a miss occurs on an item I at a site V, NAC needs to determine the fetch cost (FC) of I and of all the items in Cache(V), which requires knowledge of all sites where item I may be cached. Methods for determining this are described above in the section on Peer Discovery.

NAC Replacement Strategy

The previous subsections show how to compute Reqs and FC for a future interval T. In our case, the interval starts with the time of interest: when a miss occurs. The length of the interval is a system parameter and in our experiments ranges from 10 to 60 minutes. We have experimented with values outside this interval and achieved lower performance. This is perhaps because using smaller or larger values makes the predicted values more inaccurate. Given Reqs and FC, a VHO site may compute the network penalty of any item. We now show how to use the network penalty to decide the cache replacement strategy.

At any time, the items on a VHO cache belong to one of two categories (i) items that are currently consumed—stored in the viewSet and (ii) items that are not consumed but have not yet been evicted—stored in the stillCached list. The still-Cached items are the candidates for eviction during a miss. Let stillCached={I1, . . . , In}. Let SR be the size of item Ii from stillCached.

The VHO will take the following steps. When a miss occurs, for an item I of size S(I), the item is stored in still-Cached if S is smaller than the available cache space. If the cache is full, the network penalties of I and of all the items in stillCached are computed. Let NP(I) be the network penalty of I and NP(Ii) be the network penalty of item Ii from still-Cached. Then, I is stored in the cache only if there exists a subset R of stillCached such that the sum of all SR from the subset R is greater or equal to S(I), and the sum of all network penalties NP(Ii) of items from the subset R is less than NP(I). That is, the item is stored only if stillCached contains a set of items whose total size exceeds S(I) and whose total penalty is below NP(I). The set R is called the replacement set and contains items that may be evicted to cache item I.

It is desirable for the set replacement set to be the one that has the minimum penalty among all subsets of stillCached of size larger than or equal to S. That is, the VHO will evict the set likely to inflict the minimum future penalty on the cache.

While the invention has been particularly shown and described with reference to a particular embodiment, it will be understood by those skilled in the art that various changes in form and details may be made therein without departing from the spirit and scope of the invention. For example, the path cost for a link between two VHO sites, or between a VHO and VSO, may be based on some metric other than estimated transfer time. Additionally, while the functionality of analyzing historical traffic data takes place within a server located at a VHO, other circuitry, internal or external to the VHO may perform this task. It is intended that such changes come within the scope of the following claims.

What is claimed is:

1. A method comprising:
receiving, by a processing apparatus at a first server, a request for content from a client device;
determining that the content is not stored by the first server;
determining that there is not enough room to cache the content at the first server; and
selecting one or more items to evict from a cache at the first server to make room for the content, wherein the selection of the items minimizes a network penalty associated with the eviction of the items, wherein the network penalty is based on sizes of the content and the items, numbers of requests expected to be received for the content and the items, and fetch costs associated with retrieving the content and the items, wherein each of the fetch costs is based on a sum of link weights of links in a network path for fetching each of the content and the items, and wherein each of the link weights is based on traffic predicted on a link in the links of the network path.

2. The method of claim 1 further comprising:
determining that a second server has the content;
determining that a third server has the content;
determining that a second cost associated with retrieving the content from the second server is less than a third cost associated with retrieving the content from the third server, wherein the second cost is based on traffic which is predicted to occur over a most utilized link to the second server, and wherein the third cost is based on traffic which is predicted to occur over a most utilized link to the third server; and
in response to determining that the second cost is less than the third cost, requesting the content from the second server, wherein the first server, the second server, and the third server each maintain a different subset of content available from a master server.

3. The method of claim 2 wherein determining that the second server has the content comprises:
sending a first message to the second server, wherein the first message identifies the content; and
receiving a second message from the second server, wherein the second message indicates that the second server has the content.

4. The method of claim 2 wherein the second cost and the third cost are based on historical traffic data.

5. The method of claim 4 wherein the second cost and the third cost are further based on predicted traffic.

6. The method of claim 2 wherein the second cost and the third cost are based on predicted traffic for one or more specific time intervals during a day, and wherein the predicted traffic is based on an analysis of repetitive traffic patterns.

7. The method of claim 2 wherein the first server is a first video home office (VHO), the second server is a second VHO, and the third server is a third VHO, wherein the master server is a video service office (VSO), and wherein the client device is a set-top box (STB).

8. A non-transitory computer-readable memory comprising instructions that, when executed by a processing apparatus, cause the processing apparatus to perform operations comprising:
receiving, by the processing apparatus at a first server, a request for content from a client device;
determining that the content is not stored by the first server;
determining that there is not enough room to cache the content at the first server; and
selecting one or more items to evict from a cache at the first server to make room for the content, wherein the selection of the items minimizes a network penalty associated with the eviction of the items, wherein the network penalty is based on sizes of the content and the items, numbers of requests expected to be received for the content and the items, and fetch costs associated with retrieving the content and the items, wherein each of the fetch costs is based on a sum of link weights of links in a network path for fetching each of the content and the items, and wherein each of the link weights is based on traffic predicted on a link in the links of the network path.

9. The non-transitory computer-readable memory of claim 8 wherein the operations further comprise:
determining that a second server has the content;
determining that a third server has the content;
determining that a second cost associated with retrieving the content from the second server is less than a third cost associated with retrieving the content from the third server, wherein the second cost is based on traffic which is predicted to occur over a most utilized link to the second server, and wherein the third cost is based on traffic which is predicted to occur over a most utilized link to the third server; and
in response to determining that the second cost is less than the third cost, requesting the content from the second server, wherein the first server, the second server, and the third server each maintain a different subset of content available from a master server.

10. The non-transitory computer-readable memory of claim 9 wherein determining that the second server has the content comprises:
sending a first message to the second server, wherein the first message identifies the content; and
receiving a second message from the second server, wherein the second message indicates that the second server has the content.

11. The non-transitory computer-readable memory of claim 9 wherein the second cost and the third cost are based on historical traffic data.

12. The non-transitory computer-readable memory of claim 11 wherein the second cost and the third cost are further based on predicted traffic.

13. The non-transitory computer-readable memory of claim 9 wherein the second cost and the third cost are based on predicted traffic for one or more specific time intervals during a day, and wherein the predicted traffic is based on an analysis of repetitive traffic patterns.

14. The non-transitory computer-readable memory of claim 9 wherein the first server is a first video home office (VHO), the second server is a second VHO, and the third server is a third VHO, wherein the master server is a video service office (VSO), and wherein the client device is a set-top box (STB).

15. A system comprising:
a storage at a first server; and
a processing apparatus at the first server to:
receive a request for content from a client device;
determine that the content is not stored by the storage;
determine that there is not enough room to cache the content at the first server; and
select one or more items to evict from a cache at the first server to make room for the content, wherein the selection of the items minimizes a network penalty associated with the eviction of the items, wherein the network penalty is based on sizes of the content and the items, numbers of requests expected to be received for the content and the items, and fetch costs associated with retrieving the content and the items, wherein each of the fetch costs is based on a sum of link weights of links in a network path for fetching each of the content and the items, and wherein each of the link weights is based on traffic predicted on a link in the links of the network path.

16. The system of claim 15 wherein the processing apparatus is further to:
  determine that a second server has the content;
  determine that a third server has the content;
  determine that a second cost associated with receipt of the content from the second server is less than a third cost associated with receipt of the content from the third server, wherein the second cost is based on traffic which is predicted to occur over a most utilized link to the second server, and wherein the third cost is based on traffic which is predicted to occur over a most utilized link to the third server; and
  in response to the determination that the second cost is less than the third cost, request the content from the second server, wherein the first server, the second server, and the third server each maintain a different subset of content available from a master server.

17. The system of claim 16 wherein the processing apparatus is to determine that the second server has the content by:
  sending a first message to the second server, wherein the first message identifies the content; and
  receiving a second message from the second server, wherein the second message indicates that the second server has the content.

18. The system of claim 16 wherein the second cost and the third cost are based on historical traffic data and predicted traffic.

19. The system of claim 16 wherein the second cost and the third cost are based on predicted traffic for one or more specific time intervals during a day, and wherein the predicted traffic is based on an analysis of repetitive traffic patterns.

20. The system of claim 16 wherein the first server is a first video home office (VHO), the second server is a second VHO, and the third server is a third VHO, wherein the master server is a video service office (VSO), and wherein the client device is a set-top box (STB).

* * * * *